US010566885B2

United States Patent
Götz et al.

(10) Patent No.: US 10,566,885 B2
(45) Date of Patent: Feb. 18, 2020

(54) METHOD AND DEVICE FOR PRODUCING A CONDUCTOR SEGMENT

(71) Applicant: Dr. Ing. h.c. F. Porsche Aktiengesellschaft, Stuttgart (DE)

(72) Inventors: Stefan Götz, Forstern (DE); Malte Jaensch, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 230 days.

(21) Appl. No.: 15/808,097

(22) Filed: Nov. 9, 2017

(65) Prior Publication Data
US 2018/0152086 A1 May 31, 2018

(30) Foreign Application Priority Data
Nov. 30, 2016 (DE) .................. 10 2016 123 069

(51) Int. Cl.
*H02K 15/08* (2006.01)
*B21B 1/16* (2006.01)
(Continued)

(52) U.S. Cl.
CPC ............ *H02K 15/08* (2013.01); *B21B 1/166* (2013.01); *B21B 37/58* (2013.01); *H02K 3/02* (2013.01);
(Continued)

(58) Field of Classification Search
CPC .. H02K 3/02; H02K 3/04; H02K 3/12; H02K 3/30; H02K 15/04; H02K 15/414;
(Continued)

(56) References Cited

U.S. PATENT DOCUMENTS

| 5,031,432 A | 7/1991 | Loesch et al. |
| 5,801,471 A | 9/1998 | Hill |

(Continued)

FOREIGN PATENT DOCUMENTS

| DE | 292856 A5 | 8/1991 |
| DE | 19831481 A1 | 1/2000 |

(Continued)

OTHER PUBLICATIONS

Notification of Reason for Rejection for Japanese Application No. 2017-228631, dated Nov. 13, 2018, 2 pages.
(Continued)

*Primary Examiner* — Peter Dungba Vo
*Assistant Examiner* — Joshua D Anderson
(74) *Attorney, Agent, or Firm* — RatnerPrestia (57) ABSTRACT

A method for producing a conductor segment includes: passing a copper bar in a predetermined direction of movement through a rotating first work roll and a second work roll rotating in the opposite direction to the first work roll; rotating a first backup roll in the opposite direction to the first work roll to brace the first work roll against the copper bar with an adjustable first force directed perpendicularly to the direction of movement; rotating at least one second backup roll in the opposite direction to the second work roll to brace the second work roll against the copper bar with an adjustable second force directed counter to the first force; and adjusting the first and second forces such that the work rolls give the conductor bar a thickness that varies along its length. Also described is a corresponding device and a corresponding method for producing an electric machine.

8 Claims, 5 Drawing Sheets

(51) Int. Cl.
*B21B 37/58* (2006.01)
*H02K 3/02* (2006.01)
*H02K 3/12* (2006.01)
*H02K 3/30* (2006.01)
*H02K 15/04* (2006.01)
*H02K 15/06* (2006.01)

(52) U.S. Cl.
CPC ............... *H02K 3/12* (2013.01); *H02K 3/30* (2013.01); *H02K 15/04* (2013.01); *H02K 15/0421* (2013.01); *H02K 15/064* (2013.01); *Y10T 29/49009* (2015.01); *Y10T 29/53143* (2015.01)

(58) Field of Classification Search
CPC .. H02K 15/0421; H02K 15/064; H02K 15/08; B21B 1/166; B21B 37/24; B21B 37/26; B21B 37/30; B21B 37/38; B21B 37/58; Y10T 29/49009; Y10T 29/49012; Y10T 29/53143
See application file for complete search history.

(56) References Cited

U.S. PATENT DOCUMENTS

| | | | |
|---|---|---|---|
| 6,112,566 A | | 9/2000 | Palzer et al. |
| 6,252,327 B1 | | 6/2001 | Matsuzaki |
| 6,336,349 B1 | | 1/2002 | Hauger et al. |
| 6,439,022 B1 | * | 8/2002 | Kamada ................. B21B 13/02 72/161 |
| 8,330,318 B2 | | 12/2012 | Saito et al. |
| 2004/0207284 A1 | | 10/2004 | Neet |
| 2009/0102309 A1 | | 4/2009 | Kamibayashi et al. |
| 2011/0174042 A1 | | 7/2011 | Kamibayashi et al. |
| 2012/0025660 A1 | | 2/2012 | Patel et al. |
| 2012/0274172 A1 | | 11/2012 | Koga |
| 2014/0090240 A1 | * | 4/2014 | Ponzio ............... H02K 15/0421 29/736 |
| 2015/0311757 A1 | | 10/2015 | Tamura et al. |
| 2016/0013692 A1 | | 1/2016 | Wawrzyniak et al. |

FOREIGN PATENT DOCUMENTS

| | | |
|---|---|---|
| DE | 102005056095 A1 | 6/2006 |
| EP | 1074317 A2 | 2/2001 |
| JP | H08257612 A | 10/1996 |
| JP | 2006014530 A | 1/2006 |
| JP | 2007317636 A | 12/2007 |
| JP | 2011147312 A | 7/2011 |

OTHER PUBLICATIONS

German Search Report for German Application No. 10 2016 123 069.3, dated Nov. 7, 2017, including partial English translation, 11 pages.
Chinese Office Action for Chinese Application No. 2017112068210, dated Dec. 3, 2018, 9 pages.
Indian Examination Report for Indian Application No. 201714037771, dated Oct. 11, 2019, with translation, 6 pages.

* cited by examiner

METHOD AND DEVICE FOR PRODUCING A CONDUCTOR SEGMENT

CROSS-REFERENCE TO RELATED APPLICATION

This application claims priority to German Patent Application No. DE 10 2016 123 069.3, filed Nov. 30, 2016, the contents of such application being incorporated by reference herein in their entirety.

FIELD OF THE INVENTION

The present invention relates to a method for producing a conductor segment. The present invention furthermore relates to a corresponding device and to a corresponding method for producing an electric machine.

BACKGROUND OF THE INVENTION

In electrical engineering, the collective term coil winding technology is understood to mean any manner and method of winding up electrical conductors into a coil. In this case, "coils" should not be understood just to be separate inductive passive components; rather, in the present connection, the term covers all windings and winding materials which are suitable for generating or detecting a magnetic field. The windings of actuators, in particular of the stator and rotor of a rotating electric machine, are likewise denoted coils in the following text within this further meaning.

Winding technology thus essentially determines the properties of electromechanical assemblies having windings. These include the dielectric strength, the quality factor, the size required for a particular power or magnetic force, or the magnetic stray field. Because the requirements for energy efficiency are increasing greatly in the prior art, there are, in particular, increasing demands for the development of components for electromechanical assemblies such as electric motors.

Windings in stators and/or in rotors are usually wound especially with comparatively thin single wires—typically ones with a diameter of up to 2 mm—which are introduced into the openings (slots) in the stator or rotor iron manually or using corresponding winding and drawing-in machines. It is a known procedure to introduce bars rather than single wires into the slots, to shape these single bars and subsequently to connect, for example weld, them at their ends to form a continuous winding. Since especially short U- or V-shaped single segments that are reminiscent of hairpins are used for this purpose in the prior art, such bar windings are sometimes referred to as hairpin conductors among those skilled in the art.

Bar windings afford various advantages compared with single-wire windings: While single-wire windings still require various manual steps during manufacturing, in spite of the high degree of automation, bar windings can be produced completely automatically. In this case, the bars usually have a rectangular cross section and are segmented into equal cross sections in the slot. Bar windings thus allow better exploitation of the slots than single wires, which leave empty spaces even when tightly packed and cause a substantial loss of space as a result of insulation coating. As a result of the greater filling of the slots with copper (known as the copper filling factor), greater machine capacities can be achieved with less installation space. While, in the case of single wires, filling factors of 30% to 50% are conventional, with bar windings it is even possible to achieve more than 80%. As a result of the well-defined surface and the greater dimensions of the hairpin or bar conductors, more reliable insulation is possible both between the bars and between bars and iron. The deterioration of the insulation is one of the most significant aging mechanisms and central for the lifetime of electric machines. In the case of U-shaped segments, the single segments can be inserted into the slots from the end side during manufacturing, with the result that slots that are closed toward the air gap and are half-open are realizable, this being difficult or even impossible with single-wire windings with a continuous wire, as explained in U.S. Pat. No. 8,330,318, which is incorporated by reference herein. If the electric machine is operated at high speeds with a bar winding, the losses of the electric machine increase on account of high-frequency effects.

JP 2011 147 312 A, which is incorporated by reference herein, describes a stator winding of an electric machine, wherein various winding cross sections are provided within the slots. In that case, the windings with a smaller cross section are preferably located further in than the windings with a larger cross section.

US 2004 0207 284 A1, which is incorporated by reference herein, describes an electric machine having a stator winding made up of radially arranged conductor segments with a rectangular cross section.

US 2012 0025 660 A1, which is incorporated by reference herein, describes an electric machine having a stator winding with a multiplicity of windings with a rectangular cross section. Each winding in that case consists of two portions, wherein the inner portion of a winding is connected to an outer portion of a winding in a non-adjacent slot.

US 2012 0274 172 A1, which is incorporated by reference herein, describes an electric machine having a stator winding made up of a multiplicity of line bundles, wherein the cross section of the line bundles is flexible. The line bundles in that case are arranged such that they come into contact with adjacent line bundles.

US 2015 0311 757 A1, which is incorporated by reference herein, describes an electric machine having a stator winding made up of a multiplicity of coil conductors. In that case, the coil conductors can have different, in particular also curved cross sections.

US 2016 0013 692 A1, which is incorporated by reference herein, describes a stator for an electric machine having a multiplicity of windings which are arranged radially and the cross section of which changes depending on their position.

U.S. Pat. No. 5,801,471 A, which is incorporated by reference herein, and U.S. Pat. No. 6,252,327 B1, which is incorporated by reference herein, show further prior art relating to stator windings for electric machines.

As soon as a plurality of different conductor bar forms are required for an electric machine, it is often not advantageous to acquire them from a manufacturer on account of the now smaller quantity of each conductor form. Instead, production in situ from a single raw material inline during the manufacturing process of the machine would be desirable.

In principle, such dynamic rolling is known from the prior art. For example, EP 1 074 317 A2, which is incorporated by reference herein, describes and illustrates a method for the flexible rolling of a metal strip, wherein, during the rolling process, the metal strip is guided through a rolling gap formed between two work rolls and the rolling gap is moved in a deliberate manner during the rolling operation in order to achieve different strip thicknesses along the length of the metal strip. As a result, good flatness of the metal strip is intended to be achieved, even in the case of relatively wide strips, specifically in that, during each operation of setting the rolling gap or immediately thereafter, the elastic lines of the work rolls are controlled depending on the rolling gap set in order to achieve flatness of the metal strip.

However, such methods are provided almost exclusively for the rolling of metal strips. Curves and irregular material thicknesses along the strip are usually undesired. Only a systematic regional material weakening by way of deliberately thinner portions is proposed occasionally in the specialist literature for producing components in a material-saving manner.

SUMMARY OF THE INVENTION

Described herein is a method for producing a conductor segment and a corresponding device.

The approach according to aspects of the invention is based on the finding that a central problem in the use of segments with different cross sections or segments with subparts with different cross sections is the compatibility with standard processes. Furthermore, in particular in the case of segments with non-rectangular cross sections, standard segments cannot be used. Consequently, in-situ shaping of the segments in the production line before stator mounting would be extremely advantageous. Corresponding forming of standard bars with the required cross section takes place, according to the prior art, by rolling of the cross section. This rolling process can take place either in a cold state or in a manner supported by inductive heating of the copper piece (below the melting point).

Deformation in the transverse direction can accordingly take place by additional rolls according to the prior art of forming technology. In the case of conductor segments that are relatively narrow compared with the thickness thereof, it should be assumed that standard rolls exhibit a large degree of bending under the working pressure, this resulting in an irregular rolling result. Countermeasures taken with respect to the curving can take place by the two rolls being set (usually running in the opposite direction) relative to the running direction. This effect could be used deliberately as a degree of freedom, In order to create a variable curve on the top side and underside of the segment, but this effect is adjustable only in a very inadequate manner.

For this reason, the invention proposes working with at least four rolls, wherein two rolls serve as work rolls, which are provided with the necessary working pressure by nip rolls or backup rolls and are braced against the curve with a continuously controllable strength.

According to aspects of the invention, the creation of conductor segments can thus take place without significant material loss, this being a significant advantage on account of the high price of copper. In order to be compatible with the production process, the invention is also distinguished by a short process time, which allows production of all conductor segments that are necessary for at least one machine in a cycle (about 150 to 300 segments in 1.5 to 3 minutes). The proposed method can furthermore produce the following products: conductor segments (in one piece or in bars) with a rectangular cross section with an at least variable thickness (at a constant or fixed width), conductor segments with different curvatures and thicknesses and conductor segments with a shape that varies (continuously) along their length.

Further advantageous configurations of the invention are specified in the dependent claims. Thus, an undesired curve can be corrected via the setting angle, preferably running in the opposite direction, of the two work rolls and/or additional nip rolls. As a result of heating before the rolling step (preferably inductive heating), the hardness of the material (modulus of elasticity E and viscoelasticity $\eta$) and the grating quality after forming (in particular in the case of a high degree of deformation) can be set.

The different curvature of the conductor segments can be produced for example with a negative profile in the work rolls. However, a corresponding separate negative form is necessary in the work rolls for each different segment. Alternatively, the three central degrees of freedom of each conductor segment—namely the thickness, curvature of the top side and curvature of the underside thereof—can be set and adjusted continuously via adjustment of the following parameters: the contact pressure of the rolls, setting angle of the upper work roll, setting angle of the lower work roll and optionally the setting angle of additional nip rolls against the work rolls. With this solution and suitable adjustment of the above parameters, it is likewise possible to produce conductor segments with a shape that varies (continuously) along the length, as is immediately apparent.

BRIEF DESCRIPTION OF THE DRAWINGS

Exemplary embodiments of the invention are illustrated in the drawings and described in more detail in the following text.

DETAILED DESCRIPTION OF THE INVENTION

Figure 1:
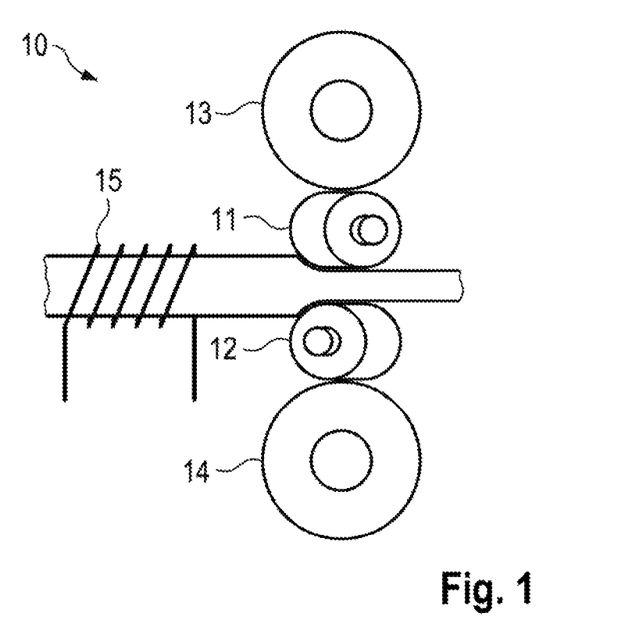
FIG. 1 shows a side view of a first device during the production of a conductor segment.

FIG. 1 illustrates a device (10) according to aspects of the invention for producing a conductor segment. The device (10) shown in this case comprises a rotating first work roll (11) and a second work roll (12) that is separated from the first work roll (11) by a rolling gap and rotates in the opposite direction thereto. A first backup roll (13) that likewise rotates in the opposite direction to the first work roll (11) and bears against the latter on the opposite side from the rolling gap braces the first work roll (11), perpendicularly to the direction of movement—horizontal according to the figure—of a copper bar running through the work rolls (11, 12), against said copper bar. The same goes for a second backup roll (14) that rotates in the opposite direction to the second work roll (12) and bears against the latter on the opposite side from the rolling gap.

Regulators (not illustrated in the drawing) in this case exert on the first backup roll (13) and the second backup roll (14) a mechanical force that is directed from above onto the first work roll (11) according to the figure and from below onto the second work roll (12) according to the figure, such that the backup rolls (13, 14) press the work rolls (11, 12) against the copper bar with a settable force that is directed perpendicularly to the direction of movement of the latter. To this end, an adjuster (likewise not depicted) connected to the first regulator and the second regulator is configured such that the work rolls (11, 12) give the conductor segment emerging from the rolling gap the desired thickness that varies along its length. The work rolls (11, 12) additionally have a profile (not discernible in FIG. 1) such that they furthermore give the conductor segment a predetermined curvature.

An inductive heater (15) heats the copper bar, before it passes through the work rolls (11, 12), to a working temperature that is above its recrystallization temperature of approximately 200° C., but under its melting point of approximately 1085° C.

Figure 2:
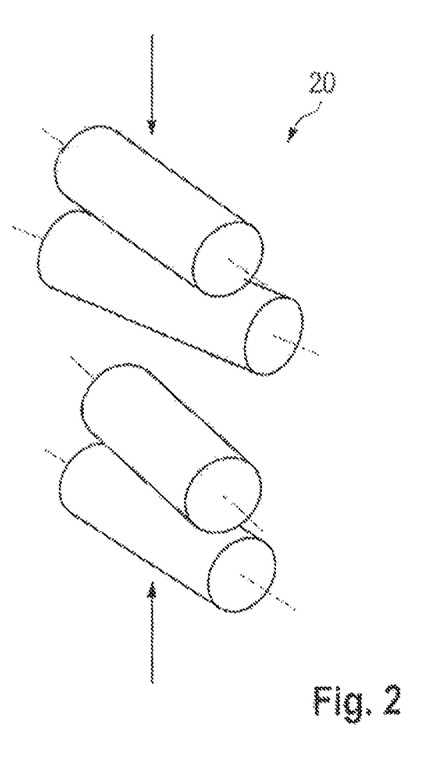
FIG. 2 shows a perspective view of a second device.

FIG. 2 illustrates a corresponding device (20), which now works as a cold roll at a temperature of below 200° C.

Figure 3:
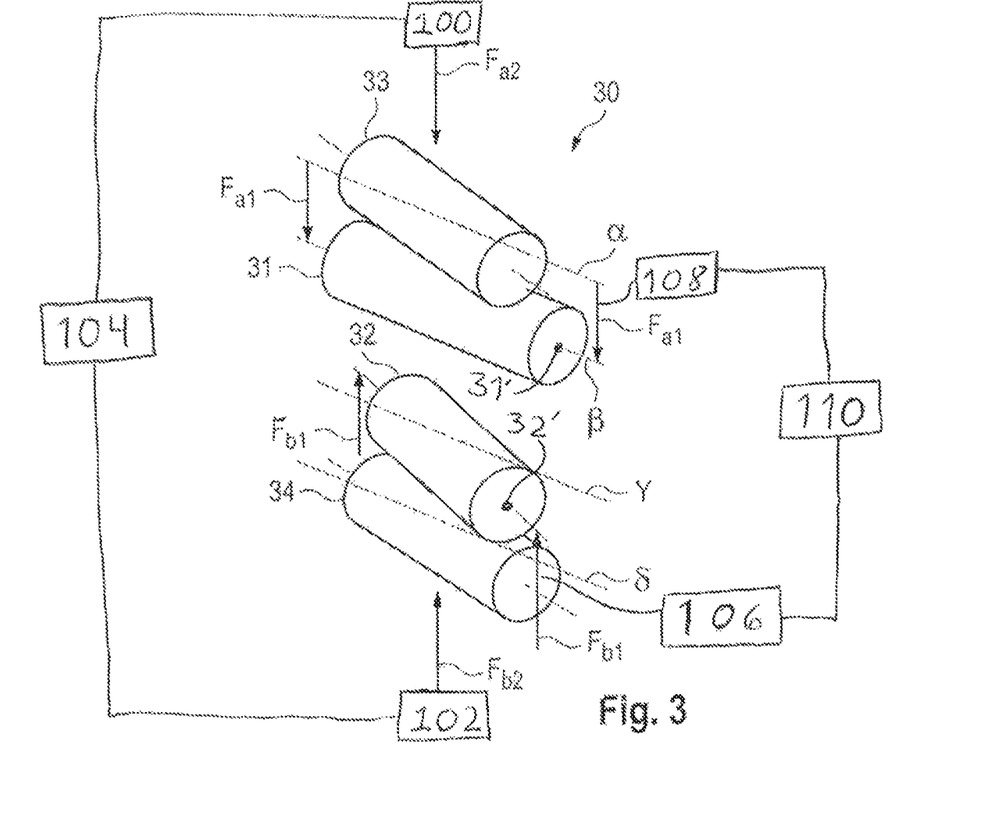
FIG. 3 shows a perspective view, corresponding to FIG. 2, of a third device.

FIG. 3 uses a third device (30) to illustrate—from a perspective matching that of FIG. 2—the following eight temporally variable parameters ($F_{a1}$, $F_{a2}$, $F_{b1}$, $F_{b2}$, α, β, γ, δ) for adjusting the shape and thickness of the conductor segment:

i. a first force ($F_{a2}$) exerted by a first regulator 100 acts on the first backup roll (33), for setting the thickness, ii. a second force ($F_{b2}$) exerted by a second regulator 102 acts on the second backup roll (34), for setting the thickness (an adjuster 104 is connected to the first regulator 100 and the second regulator 102 and is configured such that the work rolls 31 and 32 give the conductor segment a thickness that varies along a length of the conductor segment), iii. a third force ($F_{a1}$) exerted by a third regulator 108, acting on the suspension points (e.g., pivot bearing 31') of the first work roll (31), for setting the curvature on the top side according to the figure (and the thickness), wherein high pressure increases the curvature, iv. a fourth force ($F_{b1}$) exerted by a fourth regulator 106, acting on the suspension points (e.g., pivot bearing 32') of the second work roll (32), for setting the curvature on the underside according to the figure (and the thickness), wherein, again, high pressure increases the curvature, (an adjuster 110 is configured such that the work rolls 31 and 32 give the conductor segment a curve that varies along a length of the conductor segment), v. a first setting angle (α) of the first backup roll (33) for setting the curvature on the top side according to the figure, wherein a small setting angle (α) with respect to the first work roll (31) decreases the curvature thereof, vi. a second setting angle (β) of the first work roll (31) for setting the curvature on the top side according to the figure, wherein a small setting angle (β) causes a convex curvature and a large setting angle (β) causes a concave curvature, vii. a third setting angle (γ) of the second work roll (32) for setting the curvature on the underside according to the figure, wherein, likewise, a small setting angle (γ) causes a convex curvature and a large setting angle (γ) causes a concave curvature, and viii. a fourth setting angle (δ) of the second backup roll (34) for setting the curvature on the underside according to the figure, wherein a small setting angle (δ) with respect to the second work roll (34) decreases the curvature thereof.

Figure 4:
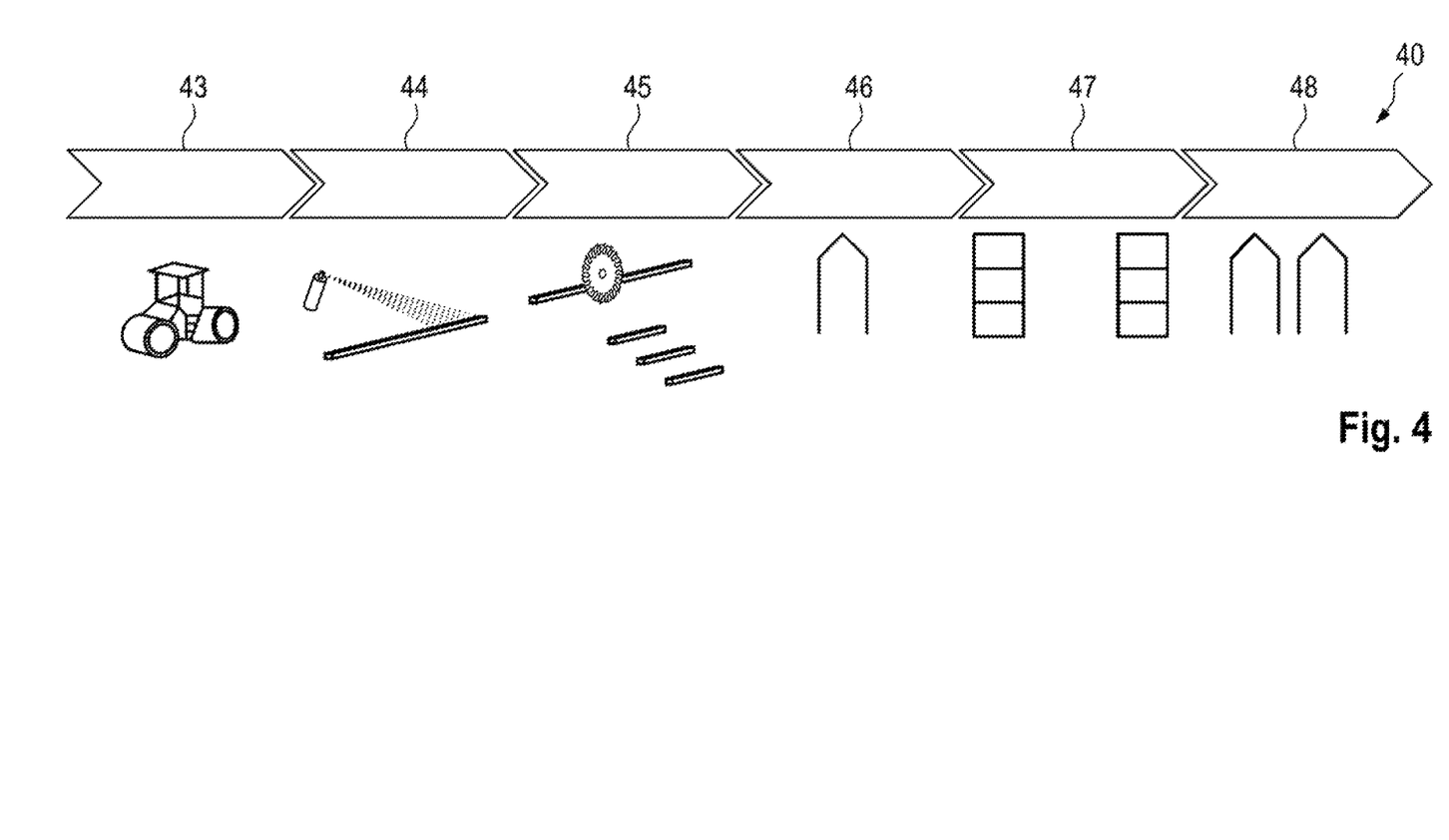
FIG. 4 schematically shows a first method according to aspects of the invention.

A production method (40) according to aspects of the invention for an electric machine will now be explained with reference to FIG. 4. The starting point is formed by the above-described profiling of the conductor segments by way of rolls (43). Following the rolling step (43), enamel insulation (44) of the conductor surface takes place (for example with polyimides or polyurethane, preferably in accordance with IEC 60317), which can be combined with a baking step (not reproduced in FIG. 4). Optionally, this is followed by cutting to length (45) of the conductor segments thus obtained. After they have been bent (46) it is optionally possible for further insulation (47) to precede the insertion (48) of the conductor segments into the rotor slot or stator slot of the machine.

Figure 5:
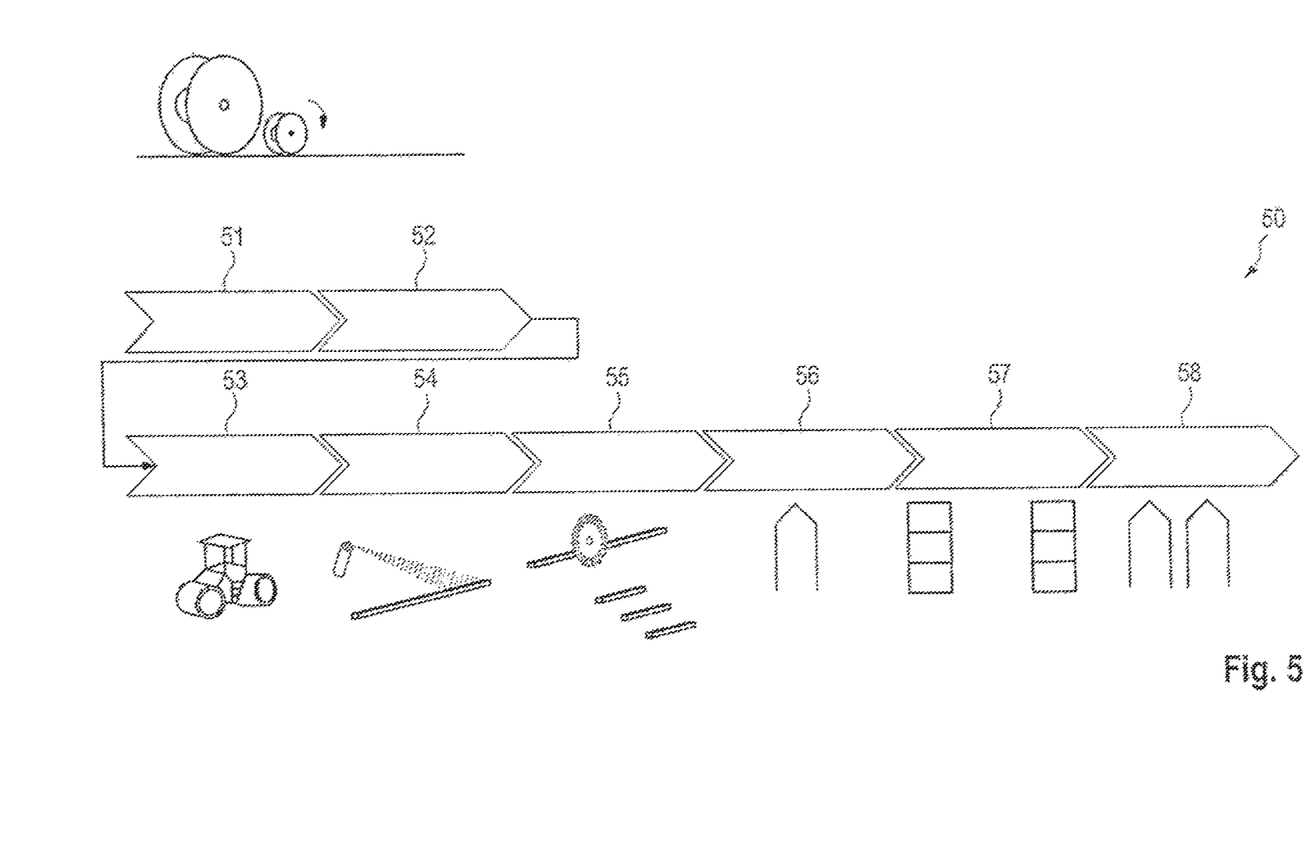
FIG. 5 schematically shows a second method according to aspects of the invention.

While this embodiment presupposes the use of substantially straight copper bars, the method (50) according to FIG. 5 expands the concept according to aspects of the invention to bars from a reel: In this case, in preparation, the copper bars are unrolled (51) and straightened (52) before they are supplied for profiling by rolls (53). The remaining method steps (54, 55, 56, 57, 58) correspond largely to those of the method (40) according to FIG. 4.

What is claimed is:

1. A method for producing a conductor segment of predetermined length, comprising the steps of:
    passing the conductor segment in a predetermined direction of movement through a rotating first work roll and a second work roll rotating in an opposite direction to the first work roll;
    rotating at least one first backup roll in the opposite direction to the first work roll to brace the first work roll against the conductor segment with an adjustable first force ($F_{a2}$) directed perpendicularly to the direction of movement;
    rotating at least one second backup roll in the opposite direction to the second work roll to brace the second work roll against the conductor segment with an adjustable second force ($F_{b2}$) directed counter to the first force ($F_{a2}$);
    adjusting the first force ($F_{a2}$) and the second force ($F_{b2}$) such that the work rolls give the conductor segment a thickness that varies along a length of the conductor segment;
    applying a settable third force ($F_{a1}$) on a pivot bearing of the first work roll;
    applying a settable fourth force ($F_{b1}$) on a pivot bearing of the second work roll; and
    adjusting the third force ($F_{a1}$) and the fourth force ($F_{b1}$) such that the first and second work rolls furthermore give the conductor segment a curve that varies along the length.

2. The method as claimed in claim 1, further comprising passing the conductor segment through the work rolls at a temperature below 200° C.

3. The method as claimed in claim 1, further comprising heating the conductor segment using an inductive heater before the conductor segment passes through the work rolls.

4. The method as claimed in claim 1, further comprising:
    positioning the first backup roll at a settable first setting angle (α) with respect to the first work roll,
    positioning the first work roll at a settable second setting angle (β) with respect to the direction of movement,
    positioning the second work roll at a settable third setting angle (γ) with respect to the direction of movement,
    positioning the second backup roll at a settable fourth setting angle (δ) with respect to the second work roll; and
    adjusting the first setting angle (α), the second setting angle (β), the third setting angle (γ) and the fourth setting angle (δ) such that the curve has a predetermined shape.

5. The method as claimed in claim 1, further comprising:
    adjusting the first force ($F_{a2}$) at the first backup roll; and
    adjusting the second force ($F_{b2}$) at the second backup roll.

6. A method for producing an electric machine using straight conductor segments, comprising the steps of:
    profiling the conductor segments using the rolls according to the method as claimed in claim 1,
    insulating the conductor segments with enamel,
    cutting the conductor segments,
    bending the conductor segments, insulating the conductor segments; and
inserting the conductor segments into a stator slot.

7. A method for producing the electric machine according to claim 6, comprising the steps of:
unrolling the conductor segments from a reel, and straightening the conductor segments.

8. A device for producing a conductor segment, comprising:
a rotatably mounted first work roll,
a rotatably mounted second work roll that is separated from the first work roll by a rolling gap,
a first backup roll that bears against the first work roll on a side of the first work roll opposite from the rolling gap,
a second backup roll that bears against the second work roll on a side of the second work roll opposite from the roll gap,
a first regulator that is configured to exert a first force ($F_{a2}$), directed toward the first work roll, on the first backup roll,
a second regulator that is configured to exert a second force ($F_{b2}$), directed toward the second work roll, on the second backup roll,
a first adjuster, connected to the first regulator and the second regulator, configured such that the work rolls give the conductor segment a thickness that varies along a length of the conductor segment,
a third regulator that is configured to apply a settable third force ($F_{a1}$) on a pivot bearing of the first work roll,
a fourth regulator that is configured to apply a settable fourth force ($F_{b1}$) on a pivot bearing of the second work roll, and
a second adjuster that is configured to adjust the third force ($F_{a1}$) and the fourth force ($F_{b1}$) such that the first and second work rolls furthermore give the conductor segment a curve that varies along the length.

* * * * *